US012651456B1

(12) United States Patent
Burnett

(10) Patent No.: US 12,651,456 B1
(45) Date of Patent: Jun. 9, 2026

(54) SYSTEM FOR GENERATING A REAL-TIME OBJECT-FOCUSED VIDEO

(71) Applicant: MXV Inc., Newark, DE (US)

(72) Inventor: Michael Burnett, Barcelona (ES)

(73) Assignee: MXV Inc., Newark, DE (US)

( * ) Notice: Subject to any disclaimer, the term of this patent is extended or adjusted under 35 U.S.C. 154(b) by 0 days.

(21) Appl. No.: 19/290,059

(22) Filed: Aug. 4, 2025

Related U.S. Application Data

(63) Continuation of application No. 19/264,027, filed on Jul. 9, 2025.

(51) Int. Cl.
*G06V 20/20* (2022.01)
*G06T 7/246* (2017.01)
(Continued)

(52) U.S. Cl.
CPC .............. *G06V 20/20* (2022.01); *G06T 7/251* (2017.01); *G06T 7/292* (2017.01); *G06T 11/00* (2013.01);
(Continued)

(58) Field of Classification Search
CPC ...... G06V 20/20; G06V 10/273; G06V 10/82; G06V 2201/07; G06T 7/251; G06T 7/292;
(Continued)

(56) References Cited

U.S. PATENT DOCUMENTS 8,170,277 B2 5/2012 Michimoto et al.
11,983,927 B1 5/2024 Goyal et al.
(Continued)

FOREIGN PATENT DOCUMENTS

CN 209181784 U 7/2019
CN 112565630 A 3/2021
(Continued)

OTHER PUBLICATIONS

Adzemovic, M., "Deep Learning-Based Multi-Object Tracking: A Comprehensive Survey from Foundations to State-of-the-Art," arXiv:2506.13457v1 [cs.CV], (Jun. 16, 2025); 39 pages.
(Continued)

*Primary Examiner* — Jeffery A Brier

(57) ABSTRACT

A system for generating a real-time object-focused video using minimal camera arrays with pre-computed sports-field-optimized spatial mapping. The system positions virtual cameras to maintain tracked objects in focused, straight-ahead orientations while supporting one-dimensional movement between two cameras using geometric interpolation and two-dimensional movement within three-camera triangular configurations using barycentric coordinates. Computer spatial mapping with discretized depth information optimized for fast-moving object tracking in sports environments eliminates real-time depth calculation overhead, avoiding latency bottleneck and enabling ultra-low latency processing suitable for live sports broadcasting. The system includes predictive camera set switching using mathematical positioning variables, multi-object tracking capabilities with distributed processing frameworks, and intelligent 2D occlusion handling optimized for broadcast video output with parallax-induced occlusion management. Video synthesis techniques including adaptive geometric transformation, and multi-resolution image processing achieve rapid processing performance for live broadcasting applications while preventing discrete camera switching artifacts through continuous interpolation coefficients that eliminate abrupt perspective transitions.

20 Claims, 5 Drawing Sheets

(51) Int. Cl.

| | |
|---|---|
| ***G06T 7/292*** | (2017.01) |
| ***G06T 11/00*** | (2026.01) |
| ***G06T 13/40*** | (2011.01) |
| ***G06T 13/80*** | (2011.01) |
| ***G06V 10/26*** | (2022.01) |
| ***G06V 10/82*** | (2022.01) |

(52) U.S. Cl.
CPC .............. *G06T 13/40* (2013.01); *G06T 13/80* (2013.01); *G06V 10/273* (2022.01); *G06V 10/82* (2022.01); *G06T 2207/10016* (2013.01); *G06T 2207/30196* (2013.01); *G06T 2207/30221* (2013.01); *G06V 2201/07* (2022.01)

(58) Field of Classification Search
CPC ......... G06T 11/00; G06T 13/40; G06T 13/80; G06T 2207/10016; G06T 2207/30196; G06T 2207/30221; H04N 13/282
See application file for complete search history.

(56) References Cited

U.S. PATENT DOCUMENTS

| | | | |
|---|---|---|---|
| 12,033,348 B1 | 7/2024 | Cao et al. | |
| 12,039,781 B2 | 7/2024 | Goyal et al. | |
| 12,067,755 B1 | 8/2024 | Nan et al. | |
| 12,254,686 B2 | 3/2025 | Mwaura et al. | |
| 12,260,491 B2 | 3/2025 | Fukuyasu | |
| 2008/0192116 A1 | 8/2008 | Tamir et al. | |
| 2008/0303901 A1 | 12/2008 | Variyath et al. | |
| 2009/0041298 A1 | 2/2009 | Sandler et al. | |
| 2011/0228092 A1 | 9/2011 | Park | |
| 2012/0162436 A1 | 6/2012 | Cordell et al. | |
| 2015/0063775 A1 | 3/2015 | Nakamura et al. | |
| 2015/0147047 A1 | 5/2015 | Wang et al. | |
| 2017/0094259 A1 | 3/2017 | Kouperman et al. | |
| 2018/0167553 A1* | 6/2018 | Yee | G06T 15/205 |
| 2018/0359427 A1 | 12/2018 | Choi | |
| 2019/0083885 A1* | 3/2019 | Yee | G06T 15/20 |
| 2019/0132529 A1* | 5/2019 | Ito | G06T 1/0007 |
| 2019/0174122 A1* | 6/2019 | Besley | H04N 13/243 |
| 2019/0259199 A1* | 8/2019 | Yee | G06T 15/30 |
| 2021/0241518 A1* | 8/2021 | Tong | H04N 23/60 |
| 2022/0417441 A1 | 12/2022 | Voelker et al. | |
| 2023/0186628 A1* | 6/2023 | Li | H04N 21/21805 382/100 |

FOREIGN PATENT DOCUMENTS

| | | | | |
|---|---|---|---|---|
| CN | 113114950 A | | 7/2021 | |
| CN | 114004773 A | * | 2/2022 | G06N 3/045 |
| CN | 114401378 A | | 4/2022 | |
| CN | 115174850 A | | 10/2022 | |
| DE | 102005033853 B3 | | 8/2006 | |
| EP | 4109893 A1 | | 12/2022 | |
| JP | H06325180 A | | 11/1994 | |
| JP | 2011130323 A | * | 6/2011 | |
| JP | 2016219968 A | * | 12/2016 | |
| JP | 2017163245 A | * | 9/2017 | |
| RU | 2706576 C1 | | 11/2019 | |
| WO | WO-2019021375 A1 | | 1/2019 | |
| WO | WO-2023196203 A1 | | 10/2023 | |

OTHER PUBLICATIONS

Audi, "Meet the Audi RS 3 Sedan," Youtube.com, (Nov. 18, 2024) [online]. Retrieved on Oct. 10, 2025 from the Internet at URL: https://www.youtube.com/watch?v=YRR25-QgoQc&t=53s, PDF of Video Screenshot Provided; 6 pages.

Chen, J. et al., "A Robust Billboard-based Free-viewpoint Video Synthesizing Algorithm for Sports Scenes," arXiv:1908.02446v1 [cs.MM], (Aug. 7, 2019); 10 pages.

Disney Research, "Algorithm combines videos from unstructured camera arrays into panoramas," Phys.org, (May 4, 2015) [online]. Retrieved on Mar. 8, 2025 from the Internet at URL: https://phys.org/news/2015-05-algorithm-combines-videosunstructured-camera.html; 3 pages.

EP Application No. 25194315.5, Extended European Search Report mailed Oct. 22, 2025; Applicant MXV Inc.; 11 pages.

EP Application No. 25382556.6, Extended European Search Report mailed Nov. 13, 2025; Applicant MXV Inc.; 10 pages.

Formula One World Championship Limited, "Highlights: Watch the Action As Piastri Takes Chinese Grand Prix Victory in McLaren 1-2," Formula1.com, (Mar. 23, 2025) [online]. Retrieved on Oct. 10, 2025 from the Internet at URL: https://www.formula1.com/en/latest/article/highlights-watch-the-action-as-piastri-takes-chinese-grand-prix-victory-in.4oxnfp2ko03MjHTvkqwloH, PDF of Video Screenshot Provided; 18 pages.

Lin, L. et al., "Line-preserving video stitching for asymmetric cameras," Multimedia Tools and Applications, [Epub Nov. 12, 2018]; (Jun. 15, 2019), 78:14591-14611.

Olympics, "Alpine Skiing Beijing 2022 | Men's downhill highlights," Youtube.com, (Feb. 7, 2022) [online]. Retrieved on Oct. 10, 2025 from the Internet at URL: https://www.youtube.com/watch?v=iZ-W2oEZfVg, PDF of Video Screenshot Provided; 13 pages.

Park, K-W. et al., "Multi-Frame Based Homography Estimation for Video Stitching in Static Camera Environments," Sensors, [Epub Dec. 22, 2019]; (Jan. 1, 2020), 20(1):92; 17 pages.

Red Bull, "World's Fastest Camera Drone Vs F1 Car (ft. Max Verstappen)," Youtube.com, (Feb. 27, 2024) [online]. Retrieved on Oct. 10, 2025 from the Internet at URL: https://www.youtube.com/watch?v=9pEqyr_uT-k&t=573s, PDF of Video Screenshot Provided; 25 pages.

Wikipedia, "Camera dolly," Wikipedia.org, first publication date unknown [online], [last edited on Jan. 15, 2025, at 19:04 (UTC)]. Retrieved on Oct. 6, 2025 from the Internet at URL: https://en.wikipedia.org/wiki/Camera_dolly; 2 pages.

Wikipedia, "Cut (transition)," Wikipedia.org, first publication date unknown [online], [last edited on Aug. 4, 2025, at 03:14 (UTC)]. Retrieved on Oct. 6, 2025 from the Internet at URL: https://en.wikipedia.org/wiki/Cut_(transition)#:~:text=In%20the%20post%2Dproduction%20process,number%20of%20transitions%20or%20effects; 2 pages.

Wikipedia, "Panning (camera)," Wikipedia.org, first publication date unknown [online], [last edited on Feb. 27, 2023, at 00:15 (UTC)]. Retrieved on Oct. 6, 2025 from the Internet at URL: https://en.wikipedia.org/wiki/Panning_(camera); 1 page.

U.S. Appl. No. 19/289,932, Non-Final Office Action mailed Feb. 27, 2026, Inventor: Burnett, 12 pages.

* cited by examiner

SYSTEM FOR GENERATING A REAL-TIME OBJECT-FOCUSED VIDEO

CROSS-REFERENCE TO RELATED APPLICATIONS

This application is a continuation of U.S. patent application Ser. No. 19/264,027, filed Jul. 9, 2025, the disclosure of which is incorporated herein by reference in its entirety.

FIELD OF THE INVENTION

The present invention relates to automated video capture systems for sports broadcasting and live event coverage, and more particularly to systems and methods for generating real-time virtual camera viewpoints that automatically maintain object-focused perspectives using minimal camera arrays with computer spatial mapping.

BACKGROUND OF THE INVENTION

Current sports broadcasting faces significant challenges in providing continuous, stable video coverage of moving objects, such as players, balls, and equipment during live events. Traditional approaches rely on expensive and potentially unsafe aerial platforms, such as helicopters or drones, to follow action across large competition areas. These flying camera systems suffer from several critical limitations, including high operational costs, safety risks to participants and spectators, difficulty in maintaining consistent viewing angles, and challenges in adverse weather conditions The theoretical ideal for sports broadcasting would be to have camera drones hovering directly behind every player and object on the field, providing personalized, continuous tracking perspectives that follow each subject's movement seamlessly. However, the practical implementation of such a system is very difficult due to airspace restrictions, safety concerns, collision risks between multiple drones, and the enormous logistical complexity of coordinating dozens of flying cameras in real-time. This creates a fundamental gap between the desired viewing experience and what is technically feasible with current automated switching approaches.

Moreover, existing ground-based camera systems suffer from fundamental coverage and continuity limitations regardless of their configuration. Single fixed cameras provide stable viewpoints but are inherently limited to narrow coverage areas, making them unsuitable for tracking fast-moving objects across large competition areas. Multi-camera systems, whether employing manual or automated switching technologies, face different but equally significant challenges. While automated switching systems have emerged to eliminate the need for skilled camera operators and reduce human error in shot selection, these systems still rely on discrete camera transitions that create abrupt perspective changes. These jarring transitions are disorienting to viewers and fundamentally break the illusion of continuous tracking, as each camera switch represents a sudden jump to an entirely different viewing angle and distance.

Recent developments in volumetric video and virtual camera technologies have attempted to address these limitations by using large arrays of cameras (typically 30 or more) to reconstruct three-dimensional scenes and generate arbitrary virtual viewpoints. However, these systems require massive computational resources, introduce significant processing delays (often several seconds), and involve prohibitively expensive infrastructure deployments that limit their practical application in live broadcasting scenarios. Additionally, these volumetric systems are designed primarily for three-dimensional scene reconstruction and virtual reality applications rather than optimized 2D broadcast video output.

In this regard, current volumetric systems employ 24 or more cameras positioned around venues to create 360-degree replays and freeze-frame effects. While these systems provide impressive visual capabilities for post-play analysis, they suffer from fundamental limitations when applied to live broadcasting scenarios. The computational overhead of real-time three-dimensional scene reconstruction and the associated processing latency make existing volumetric systems unsuitable for live sports broadcasting where sub-second response times are essential. Current volumetric implementations remove crowds from venues and lack realistic environmental elements, such as shadows and reflections, requiring substantial additional investments in computational infrastructure and processing power to achieve truly immersive experiences suitable for live broadcasting applications.

Furthermore, even after the computationally intensive 3D scene reconstruction is complete, volumetric systems still require skilled operators to manually navigate through the reconstructed 3D space and design camera movements, adding another layer of human intervention and latency to the production workflow. This manual shot design process eliminates the automation benefits that modern broadcasting demands, as operators must make real-time decisions about virtual camera positioning, movement paths, and framing within the 3D environment. In contrast to truly automated solutions, these volumetric systems merely shift the camera operation burden from physical to virtual space, still requiring human expertise to create compelling viewpoints from the reconstructed scene data.

On the other hand, the current real-time depth analysis required for image interpolation represents one of the major latency bottlenecks in existing virtual camera systems. Some real-time depth analyses perform expensive stereoscopic estimation or complex 3D scene analysis during live operation. Additionally, the complexity of managing dozens of cameras and the enormous data processing requirements create substantial operational challenges and costs that limit practical deployment for routine live sports broadcasting.

There exists a need for an automated video system that can provide continuous, stable tracking of moving objects across large areas and generate automated object-focused perspectives that replicate the theoretical ideal of camera drones following each object, operating with minimal camera infrastructure, achieving ultra-low latency suitable for live broadcasting applications (latency below 250 milliseconds (ms)), and generating high-quality 2D video output optimized for live broadcast.

SUMMARY OF THE INVENTION

The present invention relates to a system and method for generating real-time, object-focused video using a virtual camera framework. The system comprises a plurality of cameras arranged in predetermined configurations, an object detection and tracking module using convolutional neural networks, a computer spatial mapping module for generating spatial and depth data, a virtual camera positioning controller for computing optimal virtual camera locations based on tracked object positions, and a video synthesis module that interpolates real camera feeds to generate virtual viewpoints.

The system enables continuous, object-focused video output by dynamically adjusting virtual camera positions based on object motion and spatial context. The virtual camera remains focused on tracked objects in preferred orientations, such as centered, perpendicular, or angular perspectives, without requiring physical camera movement or discrete camera switching. This approach eliminates abrupt viewpoint transitions by employing smooth interpolation across multiple camera feeds.

Configurations include both one-dimensional (two-camera) and multi-dimensional (three or more cameras) setups, with virtual camera positioning achieved through geometric interpolation techniques, such as barycentric coordinates or bilinear interpolation. Applications support both single-object and multi-object tracking with simultaneous generation of independent virtual views.

To reduce latency, the system leverages pre-computed, discretized spatial mapping data, particularly optimized for high-speed environments, like sports fields and racing circuits. This avoids computationally intensive real-time stereoscopic depth reconstruction. Additionally, the system includes occlusion management features, predictive switching algorithms, and Graphics Processing Unit (GPU)-accelerated processing to ensure low-latency, artifact-free output.

The invention further encompasses methods and software implementations for executing the above processes, including dynamic angle adjustments, trajectory smoothing, predictive transitions, and multi-object viewpoint generation through parallel pipelines.

BRIEF DESCRIPTION OF THE FIGURES

The above and other advantages and features will be more fully understood following this detailed description of some example embodiments with reference to the attached drawings. These should be considered illustrative and not limiting.

DETAILED DESCRIPTION OF THE PREFERRED EMBODIMENT

Figure 1:
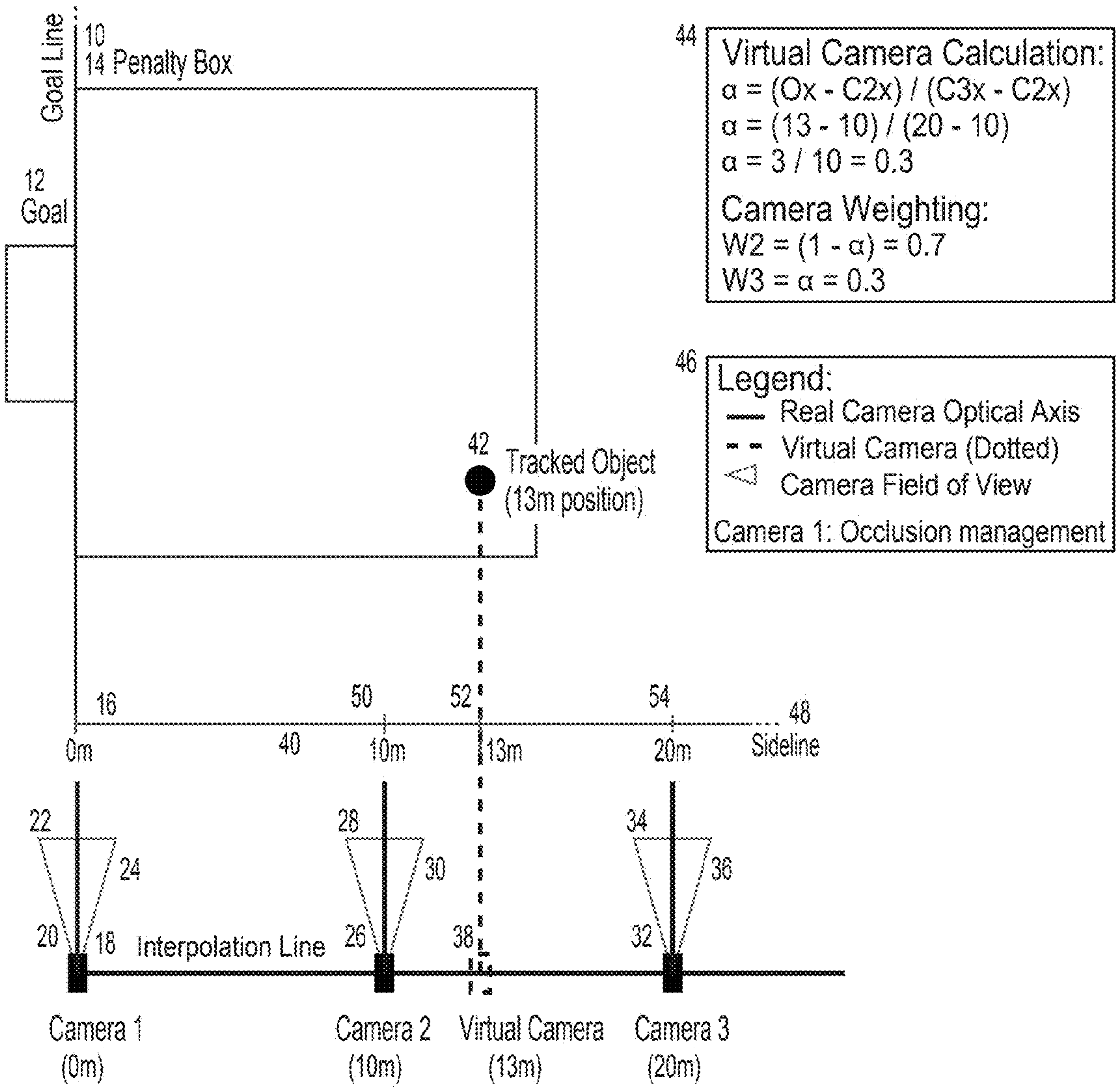
FIG. 1 shows a schematic overview of the automated virtual camera system with two-camera linear configuration.

In the following detailed description, numerous specific details are presented in the form of examples to provide a thorough understanding of the relevant teachings. However, it will be apparent that the system and method described herein can be practiced without such details.

All the figures refer to a same embodiment of the present invention without this embodiment being limiting.

Among other aspects, the invention is directed to a system for tracking an object from a desired or focused orientation. An exemplary system determines virtual camera positions and corresponding viewpoints that maintain the object in the desired orientation relative to the viewer or virtual camera.

Thus, the present invention provides a system for generating a real-time object-focused video. The system comprises:

- a plurality of cameras placed at predetermined positions;
- an object detection and tracking module that comprises a data processing device comprising an algorithm configured to identify and continuously track at least one moving object within a coverage area using convolutional neural networks (CNN);
- a computer spatial mapping module configured to calculate spatial data and depth for any point position within the coverage area;
- a virtual camera positioning controller configured to automatically determine virtual camera positions that maintain tracked objects according to a focused orientation or desired orientation; and
- a video synthesis module configured to generate virtual camera viewpoints by interpolating video feeds from the plurality of cameras.

When referring to object or objects, these may be living organisms, such as athletes or inanimate objects, such as balls. That is, an object is considered to be any material body. The present invention provides a system where virtual cameras are able to output frames for broadcasting where any desired tracked object is focused in said output frame.

The term "object-focused" or "focused oriented/orientation" as used throughout this specification refers to virtual camera positioning that maintains tracked objects within the generated viewpoint at positions optimized for the specific application and viewing requirements, rather than requiring literal center positioning within the video frame. Object positioning within the frame is determined by the practical viewing needs of the sport or application, with the virtual camera positioning algorithms providing the geometric framework for maintaining optimal object visibility regardless of the object's specific location within the frame.

In certain applications, centered focusing of the object provides optimal viewing when action occurs both in front of and behind the tracked object, such as basketball players who may move in any direction or soccer midfielders involved in bidirectional play. These situations can be named more specifically an object centered perspective or point of view. However, many sports and tracking scenarios benefit from intentional off-center object positioning that emphasizes the primary direction of action or anticipated movement. For example, tennis implementations may position tracked players toward one side of the frame to maximize coverage of the court area where the primary action occurs, while minimizing less relevant background area. Similarly, football tracking may position quarterbacks off-center to emphasize downfield coverage areas where passing plays develop.

The virtual camera positioning mathematics remain unchanged regardless of the desired object positioning within the frame, as the geometric algorithms determine the optimal virtual camera location for maintaining the tracked object within the field of view. The specific positioning of the object within the generated video frame may be achieved through video output cropping and framing adjustments that do not affect the underlying virtual camera positioning calculations. This approach provides implementation flexibility for sport-specific optimizations while maintaining the core mathematical framework that enables automated virtual camera positioning and seamless tracking across coverage areas.

Reactive smoothing implementations may also result in temporary off-center object positioning as the system balances tracking responsiveness with viewing comfort during rapid directional changes or unpredictable object movement. These positioning variations represent normal system operation and demonstrate the flexibility of the object-focused approach in accommodating diverse tracking scenarios while maintaining automated virtual camera positioning capabilities.

On the other hand, each of the cameras of the plurality of cameras of the system are real and physical cameras and preferably have high-resolution video capture at broadcast frame rates and provide optical characteristics suitable for coverage area dimensions and tracking accuracy requirements. The coverage area may be, for example, a football field, a basketball court or an F1 (Formula 1) race track. In order to position each of the plurality of cameras, hardware, such as stable mounting devices, can be employed. These are configured to maintain precise geometric relationships between cameras throughout operation of the virtual camera system.

Each camera's three-dimensional position, orientation, and optical characteristics from the plurality of cameras are measured and recorded relative to the coverage area. This includes lens distortion parameters, focal length data, and sensor specifications that affect perspective calculations. The registration establishes the geometric foundation for all virtual camera positioning algorithms.

The object detection and tracking module is preferably a digital module configured to detect and track at least one moving object within a coverage area. This moving object can be previously identified by user according to its needs. This object detection and tracking module includes a data processing device comprising an algorithm that is able to identify and track, preferably continuously, the moving object. The mentioned algorithm may be, for example, a computer vision algorithm configured to identify and continuously track multiple objects within the camera coverage area. The algorithm preferably employs machine learning based object recognition optimized for sports environments and moving object scenarios and, more specifically, may also be configured to employ lightweight convolutional neural networks (CNN). These lightweight CNN are optimized for real-time performance and, more specially, for ultra-low latency performance (ultra-low latency performance for video broadcasting is currently considered to be latency below 250 ms, as technology advances the threshold for ultra-low latency could decrease), including but not limited to depth-wise separable convolutions and mobile-optimized neural network designs that reduce computational complexity while maintaining detection accuracy. These lightweight models achieve rapid inference times on modern Graphics Processing Unit (GPU) hardware. Optionally, the object detection and tracking module may employ machine learning-based object recognition optimized for sports environments and moving object scenarios.

The computer spatial mapping module fundamentally eliminates the computational overhead of real-time calculation of spatial data of discretized objects by leveraging known coverage area geometry. Unlike traditional systems that perform expensive stereoscopic depth estimation or three-dimensional scene reconstruction during live operation, and unlike general-purpose spatial mapping systems designed for comprehensive 3D scene reconstruction or virtual reality applications, the system analyzes the coverage area before live broadcasting the event and creates comprehensive spatial reference data specifically optimized for fast-moving object tracking in 2D broadcast applications. This pre-live broadcast analysis involves defining a coverage area, for example, the football field, the basketball court or the F1 race track, and measuring dimensions, boundaries, elevation changes, and fixed reference points from this coverage area. The pre-live broadcast analysis includes identifying key landmarks, such as goal posts, sidelines, center markers, and any permanent fixtures that serve as spatial reference points.

Within the scope of the invention a virtual camera can be regarded as a Computer-Generated Imagery (CGI)-based simulated viewpoint positioned between at least two real cameras interpolated to generate computer generated images of an object.

Thus, the virtual camera positioning controller determines optimal virtual camera positions to maintain tracked objects in straight-ahead orientations (i.e., the tracked objects being followed appearing straight in front of a viewer/camera, not off to the side or at an angle) through real-time positioning algorithms. These algorithms, such as gradient descent optimization, Kalman filtering, or least-squares minimization techniques, automatically determine optimal virtual camera locations within the interpolation space defined by the plurality of cameras for maintaining object-focused perspectives and provide the computational framework for real-time virtual camera positioning without requiring complex motion prediction or advanced trajectory modeling that could introduce processing latency incompatible with live broadcasting requirements. The geometric positioning algorithms include but are not limited to linear interpolation methods, barycentric coordinate systems, bilinear interpolation, matrix transformation approaches, and equivalent mathematical frameworks that enable continuous virtual camera positioning along defined interpolation paths. The optimal position for the virtual camera is preferably determined by the geometric constraints that ensure the virtual camera's optical axis maintains the desired orientation relative to the tracked object.

Unlike conventional systems that rely on fixed camera positions or simple interpolation methods, the controller enables preferably continuous, precise virtual camera positioning with sub-meter accuracy along defined interpolation paths.

The virtual camera positioning controller continuously analyzes tracked object positions and calculates the optimal virtual camera position that maintains the object within the generated viewpoint according to configurable angular relationships. This calculation accounts for object movement and geometric constraints of the predetermined camera configuration for the plurality of cameras.

More specifically, the controller can employ geometric positioning calculations, including linear interpolation formulas and barycentric coordinate systems, to automatically determine optimal virtual camera positions that maintain tracked objects in focused, configurable orientations regardless of object movement patterns.

It should be noted that the virtual camera positioning controller fundamentally differs from AI-powered camera switching in that it generates specific desired virtual viewpoints through mathematical interpolation, rather than selecting among existing camera feeds. This enables smooth, continuous tracking, which would be very difficult with discrete camera selection.

In a preferred embodiment of the invention, the virtual camera positioning controller performs geometric analysis to determine the virtual camera position that achieves a desired angular relationship while maintaining optimal object positioning. For this analysis, the controller may also utilize the spatial data of the computer spatial mapping system.

In turn, the video synthesis module generates virtual camera viewpoints by interpolating and preferably blending video feeds from the plurality of cameras. This process preferably involves geometric warping and intelligent blending to create seamless virtual viewpoints optimized for ultra-low latency performance.

The video synthesis module can employ advanced mesh warping algorithms, including but not limited to adaptive mesh techniques that divide each camera frame into geometric elements, enabling transformation of image regions based on depth and perspective requirements. The mesh density can adapt dynamically based on scene complexity and object proximity, providing higher resolution warping in areas containing tracked objects while using coarser meshes for background regions.

For pixel-accurate image alignment between camera viewpoints, the system may utilize dense correspondence algorithms, such as bidirectional optical flow and equivalent techniques, which establish correspondence maps between camera pairs. These correspondence fields are computed using hierarchical optical flow algorithms optimized for real-time performance, enabling sub-pixel accurate image registration essential for seamless virtual viewpoint synthesis.

The system determines optimal virtual camera positions that maintain tracked objects in consistent viewing orientations through geometric positioning algorithms. The system calculates virtual camera positioning such that the virtual camera's optical axis maintains a desired angular relationship with the tracked object, providing automated object-focused perspectives that replicate the theoretical ideal of camera drones following each subject, but achieved through fixed camera installations with ultra-low latency processing.

The system distinguishes from volumetric approaches that require 30 or more cameras and extensive computational infrastructure by achieving equivalent object-focused tracking through mathematical positioning algorithms using minimal camera arrays, that is, camera arrays of two or more cameras.

In an exemplary embodiment of the invention, the object detection and tracking engine module is configured to detect and track objects with a latency performance under 250 ms.

The computer spatial mapping module is further configured to eliminate real-time depth calculation by providing instant depth estimation based on coverage area geometry with discretized spatial resolution specifically configured for fast-moving object tracking applications and hierarchical spatial indexing for rapid lookup operations, avoiding the computational overhead of real-time stereoscopic depth analysis that represents a major latency bottleneck in existing virtual camera systems.

More specifically, the computer spatial mapping system eliminates the computational overhead of real-time depth information calculation, a subset of the spatial data, by leveraging known coverage area geometry.

This approach addresses the major latency bottleneck in existing virtual camera systems where real-time depth analysis for image interpolation creates processing delays incompatible with live broadcasting requirements. The computer spatial mapping system enables the generation and storage of a spatially mapped coverage area before live competition, including but not limited to spatial relationships between discretized objects based on the geometric constraints and movement patterns typical of the respective sport environment. As such, during live competition, stored depth information, such as depth relationships, can be looked up for real-time processing rather than requiring complex real-time scene analysis.

In another embodiment of the invention, the computer spatial mapping system calculates and stores the geometric relationships between positions within the coverage area and each camera position from the plurality of cameras, with spatial resolution determined by the requirements for tracking fast-moving objects in sports environments. This creates a comprehensive spatial model specifically optimized for sports applications that accounts for perspective distortion, parallax effects, and depth relationships across the entire coverage area, The coverage area may be divided into a spatial grid specifically designed for sports broadcasting applications, with each grid cell containing pre-live broadcast computed depth, distance, and perspective correction data relative to all camera positions. Grid resolution and organization are optimized based on the movement patterns and tracking accuracy requirements typical of sports environments rather than general-purpose 3D mapping applications. These calculations create comprehensive lookup tables that enable instantaneous retrieval of spatial data during live operation.

The computer spatial mapping module eliminates real-time depth calculation overhead by pre-computing spatial relationships and storing them in optimized data structures, including but not limited to discretized lookup tables, hierarchical spatial indexing systems, and vectorized arrays. The module may employ various data organization approaches, such as multi-level spatial trees, hash-based indexing, or equivalent structures optimized for parallel processing to enable rapid query times for positions within the coverage area. Pre-computed perspective transformation matrices and geometric correction parameters are stored for instant retrieval, avoiding computationally expensive real-time stereoscopic depth analysis. This approach provides the processing performance essential for live broadcasting applications by leveraging known coverage area geometry rather than requiring complex real-time scene reconstruction.

The spatial mapping system can integrate seamlessly with the synthesis module, providing the geometric foundation for accurate virtual camera positioning. As tracked objects move and virtual camera positions change. The spatial mapping system may provide:

Instant Depth Estimation: Sub-millisecond lookup of depth information for any object position within the coverage area.

Perspective Correction Parameters: Pre-live broadcast perspective transformation matrices are computed for any virtual camera position along the interpolation path enabling direct coordinate transformation without real-time matrix calculations reducing latency.

Multi-Object Depth Relationships: When multiple objects appear simultaneously within the field of view, the system maintains accurate relative positioning by applying differential parallax corrections based on each object's individual depth coordinates. Objects closer to the virtual camera position undergo greater perspective adjustment than more distant objects, preserving natural depth perception and spatial relationships.

Relative Position Preservation: The parallax correction algorithms ensure that when multiple players are visible in the generated virtual viewpoint, their relative positions and distances from each other are maintained accurately, preventing artificial clustering or spacing that could occur with uniform correction applied to all objects regardless of depth.

Geometric Validation: Spatial constraints and validation data to ensure virtual camera positions remain within geometrically valid bounds.

For standardized competition areas, such as soccer fields, football fields, basketball courts, and tennis courts, the computer spatial mapping module leverages the known geometric constraints and established dimensions to create comprehensive depth lookup tables optimized for real-time performance.

The module exploits the fact that most tracked objects (players, balls, equipment) are constrained to move on or near a planar surface with known elevation. For a standard soccer field, the module pre-computes depth relationships based on the geometric principle that an object distance from any camera position can be calculated directly from the object's field coordinates when the playing surface elevation is known.

The coverage area is divided into a hierarchical spatial grid with adaptive resolution based on tracking accuracy requirements and camera positioning. High-traffic areas, such as goal zones, center circles, and penalty areas, receive higher spatial resolution (sub-meter grid spacing), while perimeter areas utilize coarser resolution to optimize storage and lookup performance.

Each grid cell contains pre-computed depth vectors relative to all camera positions, perspective transformation coefficients, and interpolation weights for virtual camera positioning. The comprehensive depth lookup tables are optimized for real-time performance through vectorized data structures that enable parallel processing and sub-millisecond query times during live operation.

Spatial data is organized in vectorized lookup tables optimized for parallel GPU processing, enabling simultaneous depth queries for multiple tracked objects. The vectorized lookup tables utilize contiguous memory layouts optimized for Single Instruction, Multiple Data (SIMD) operations, enabling parallel processing of multiple depth queries with single instruction cycles.

The spatial mapping module incorporates field lines, boundaries, and markers as geometric constraints to ensure accurate object depth placement and prevent spatial anomalies. Sidelines, goal lines, center circles, and penalty areas serve as reference constraints that prevent tracked objects from being incorrectly positioned outside valid competition areas.

In cases where players are detected beyond sidelines, they are constrained to sideline depth regardless of visual positioning, while objects crossing field boundaries trigger depth validation using boundary-relative positioning, namely, Boundary Constraint Enforcement. Goal posts, corner flags, and permanent markers provide fixed reference points for depth validation, and field markings create geometric "rails" that constrain object positioning within valid spatial bounds For marker-Based Depth Validation, the module uses visible field markings as real-time calibration references, for example, the center circle provides known radius constraint for objects within the circle, the penalty box boundaries enforce geometric limits on object positioning, the goal line and touchline intersections provide precise coordinate reference points, and the hash marks and yard lines (e.g., of an American football field) create regularly spaced depth reference grid.

For elevated Object Tracking (e.g., balls and projectiles that frequently move at significant elevations above the playing surface, such as soccer balls, footballs, basketballs), the module implements hybrid depth analysis that combines pre-computed spatial mapping with minimal real-time calculation to maintain ultra-low latency performance. The elevated ball tracking system leverages the advantageous visibility characteristics of airborne objects, which are typically unoccluded and visible against ground-based objects, enabling rapid and accurate positioning.

In a preferred implementation, the module's primary approach for elevated ball tracking utilizes rapid parallax analysis between multiple cameras, leveraging the pre-computed spatial mapping to accelerate the calculation process rather than performing full stereoscopic depth analysis. Since elevated balls are typically not occluded and visible against contrasting backgrounds (e.g., sky, stadium, ground-based players), parallax calculation can be performed with high confidence and minimal computational overhead.

In other embodiments that include areas with variable geometry, like complex competition areas, such as Formula 1 racing circuits, ski slopes, cycling courses, and golf courses, the computer spatial mapping module adapts to accommodate variable elevation, curved paths, and architectural complexity while maintaining the core principle of eliminating real-time depth calculation performing, according to the case, a Three-Dimensional Geometric Surveying Process, Adaptive Spatial Tessellation or parametric path modelling.

Prior to competition events, the module performs comprehensive three-dimensional mapping of the competition area using established surveying methodologies, including but not limited to laser scanning, photogrammetry, Global Positioning System (GPS) coordinate mapping, and traditional surveying techniques. This process creates a detailed elevation model with sub-meter accuracy across the entire coverage area, capturing elevation changes, banking angles, architectural features, and any permanent obstacles or structures.

Alternatively, complex competition areas are divided using adaptive tessellation algorithms that create irregular spatial elements conforming to the natural geometry of the venue. High-curvature areas, such as track turns, elevation transitions, and architectural features, receive dense tessellation with higher spatial resolution, while straight sections and uniform areas utilize larger tessellation elements for computational efficiency.

For racing circuits and defined competition paths, the module is configured to perform parametric mathematical models that describe the three-dimensional centerline and boundaries of the competition area. These parametric descriptions enable rapid calculation of depth relationships even for curved and elevation-variable paths, providing the geometric foundation for depth lookup operations during live tracking.

Also, the mapping module accommodates various calibration methodologies based on venue requirements and available resources. Fully automated approaches utilize computer vision-based structure-from-motion techniques to establish spatial relationships from camera feeds, while manual-assisted approaches incorporate surveying equipment, GPS coordinates, and architectural drawings to enhance mapping accuracy in complex environments.

In another embodiment of the invention, the plurality of cameras defines at least a first set of cameras comprising at least a first camera from the plurality of cameras and a second set of cameras comprising at least a second camera from the plurality of cameras, wherein the algorithm of the object detection and tracking module is configured also to identify and track the moving object within a first coverage area defined by the first set of cameras and a second coverage area defined by the second set of cameras, wherein the virtual camera positioning controller comprises a switching coordinator configured to determine the set of cameras in which the moving object is within its coverage area and the virtual camera position is determined by the controller based on this set of cameras.

Preferably, this switching coordinator is configured to analyze object positioning variables and motion vectors to seamlessly transition between different camera sets as an object approach coverage area defined by the corresponding set of cameras.

In one embodiment of the invention, at least two cameras of the plurality of cameras have a two-camera linear arrangement positioned along the x-axis at coordinates (C1x, C1y) and (C2x, C2y). In this case, the virtual camera position is determined by the fractional parameter alpha along the interpolation line: Virtual Camera Position: V=C1+alpha (C2−C1), where alpha is calculated as: alpha=(Ox−C1x)/(C2x−C1x).

This formula ensures that the virtual camera's optical axis, oriented perpendicular to the camera baseline, passes through the tracked object position O(Ox, Oy). The geometric derivation assumes standard lens field of view constraints typically ranging from a 50° to 120° horizontal field of view, ensuring practical implementation with conventional broadcasting camera equipment.

The camera weighting coefficients for video synthesis follow directly from the positioning parameter: W1=(1−alpha) and W2=alpha, providing smooth interpolation between camera viewpoints as alpha varies from 0 to 1 across the interpolation line.

In another embodiment of the invention, the plurality of cameras comprises three or more cameras arranged to define a multi-dimensional area enabling two-dimensional virtual camera movement within the area defined by the camera positions of these three or more cameras using barycentric coordinates.

In this case, the triangular three-camera configuration employs barycentric coordinates to enable two-dimensional virtual camera positioning within the plane defined by the camera triangle. This mathematical framework provides the minimum camera requirement for full two-dimensional virtual camera movement while maintaining computational efficiency.

For these 3 cameras (for example: C1, C2, and C3) positioned at coordinates forming a triangle, any point P within the triangular area can be expressed as a weighted combination using barycentric coordinates: P=alpha1*C1+alpha2*C2+alpha3*C3, subject to the constraints: alpha1+alpha2+alpha3=1 and all alpha values >=0.

Then, given a tracked object at position O(Ox, Oy), the optimal virtual camera position within the triangular area is determined by solving the barycentric coordinate system where the virtual camera's optical axis maintains the desired angular relationship with the tracked object. The virtual camera positioning controller computes the barycentric coordinates such that:

1. the virtual camera position P lies within the triangular area,
2. the optical axis orientation achieves the specified angular relationship with the tracked object, and
3. the geometric constraints of the camera field of view coverage are satisfied.

The direct correspondence between barycentric coordinates and camera weighting coefficients (W1=alpha1, W2=alpha2, W3=alpha3) provides computational efficiency for real-time video synthesis, eliminating the need for separate interpolation weight calculations.

It should be noted that the barycentric coordinate system naturally enforces geometric validity through its mathematical constraints. When any coordinate approaches zero (alpha1→0, alpha2→0, or alpha3→0), the virtual camera approaches the edge of the triangular interpolation area, providing clear indicators for the switching coordinator.

In one embodiment of the invention, wherein the system also includes a switching coordinator and the plurality of cameras has two-camera configurations and/or a triangular three-camera configurations, the switching coordinator uses positioning variables including alpha positioning variables for two-camera configurations and/or barycentric coordinates for three-camera configurations to predict set transitions.

It should be noted that while triangular configurations provide the minimum camera requirement for two-dimensional movement, the mathematical framework extends to support additional camera configurations that may be preferable for specific venue infrastructures or sporting applications.

For example, for a four-camera rectangular configuration with a rectangular arrangement with cameras positioned at (x1,y1), (x2,y1), (x1,y2), and (x2,y2), the controller utilizes bilinear interpolation mathematics, as follows:

Virtual Camera Position: P(x,y) within the rectangular area, and

Interpolation weights: W1=(x2−x)(y2−y)/((x2−x1)(y2−y1)), W2=(x−x1) (y2−y)/((x2−x1)(y2−y1)), W3=(x2−x)(y−y1)/((x2−x1)(y2−y1)), W4=(x−x1)(y−y1)/((x2−x1)(y2−y1)).

For a six-camera hexagonal configuration, the mathematical framework extends the triangular approach to encompass six cameras positioned at the vertices of a regular or irregular hexagon, enabling more sophisticated virtual camera positioning for specialized applications requiring 360-degree coverage capability.

Then, it is clear that the system supports multiple deployment configurations adapted to different venue types and coverage requirements, providing flexibility for various sporting environments while maintaining the core virtual camera positioning capabilities.

In this regard, for traditional field sports with a rectangular field, such as a soccer or football field, camera arrays are positioned along sidelines and endlines, or overhead to provide optimal coverage of the playing area. Multiple cameras sets of 2-3 cameras each cover sequential zones of the field, with overlapping coverage areas enabling seamless transitions as tracked objects move between zones.

Concerning linear racing venues, such as Formula 1 circuits or track and field events, camera arrays are positioned at strategic points along the racing line or track. Two-camera linear configurations provide one-dimensional virtual camera movement along straight sections, while three-camera triangular configurations cover turn areas requiring two-dimensional positioning capability. The modular approach enables coverage of extended racing circuits through sequential camera set deployment.

In relation to indoor court sports, such as basketball or tennis, camera arrays are positioned around the court perimeter or overhead, taking advantage of elevated mounting positions available in indoor venues. Three-camera triangular configurations provide comprehensive coverage of court areas, with camera positioning optimized for the smaller coverage areas typical of court sports. The reduced venue size enables higher spatial mapping resolution and enhanced tracking accuracy.

It should be noted that large venues requiring extensive coverage area support implement multiple camera sets arranged as sequential zones, each maintaining independent virtual camera generation capability. The total camera count scales from 6-8 cameras for single-zone coverage to 20 or more cameras for comprehensive multi-zone implementations, with each individual camera set maintaining the ultra-low latency processing characteristics through the 2D-optimized approach rather than complex volumetric reconstruction.

In one embodiment of the invention, the system is capable of generating multiple independent video streams, each maintaining object-focused perspectives of different tracked subjects with parallel processing optimization. The distributed multi-object architecture employs dedicated processing threads for each tracked object, enabling scalable performance and independent stream generation.

The system provides broadcasters with automated, cost-effective solutions for generating professional-quality object-focused video coverage while maintaining the responsiveness required for live sports applications. More specifically, unlike volumetric systems that require complex 3D scene reconstruction, the system is specifically optimized for 2D broadcast video output, enabling ultra-low latency processing by avoiding unnecessary 3D computational overhead while maintaining natural depth relationships through intelligent parallax management.

Also, the system may be operated automatically, eliminating the need for skilled camera operators, and provides a fixed installation reliability compared to drone-base systems.

Lastly, the system provides a scalable architecture supporting various competition area sizes and configurations.

In the preferred embodiment shown in the figures, the system comprises several integrated components working in coordination to provide real-time object-focused video generation. The system architecture is designed to minimize computational overhead while maximizing tracking accuracy and video quality.

Core System Components may include:

Camera Array Management Module,

Object Detection and Tracking Engine,

Computer Spatial Mapping System,

Virtual Camera Positioning Controller,

Video Synthesis and Output Module, and

Predictive Switching Coordinator.

Perspective Transformation Mathematics. The geometric positioning algorithms integrate with perspective transformation calculations to ensure accurate virtual viewpoint synthesis. As the virtual camera position changes within the interpolation space, the perspective correction applied to each physical camera's video feed varies according to the geometric relationships established by the positioning mathematics.

Transformation Parameter Calculation: For any virtual camera position determined by the geometric positioning algorithms, the perspective transformation parameters for each physical camera are computed based on:

1. the geometric relationship between the virtual camera position and each physical camera position,
2. the depth information provided by the computer spatial mapping system, and
3. the angular orientation requirements for the desired virtual perspective.

The transformation calculations utilize the same coordinate systems and mathematical frameworks established by the positioning algorithms, ensuring mathematical consistency throughout the video synthesis process.

FIG. 1 shows an example with specific parameters, illustrating a two-camera linear configuration of the system positioned adjacent to a soccer field. This figure shows a goal line 10, a goal 12, a penalty box 14, and a sideline 16 extending with continuation markings to indicate the field extends beyond the illustrated area. The figure is not drawn to scale, and in actual implementation, the camera fields of view would exhibit greater overlap than depicted.

Three cameras are positioned along an interpolation line 18 at measured distances from the goal line 10. Camera 1 20 is positioned at the 0 m mark 48, Camera 2 26 at the 10 m mark 50, and Camera 3 32 at the 20 m mark 54. Each camera includes a field of view indicated by triangular projections: field of view 22 for Camera 1, field of view 28 for Camera 2, and field of view 34 for Camera 3. In actual deployment, these fields of view would overlap substantially across the field coverage area.

Each camera is equipped with an optical axis oriented perpendicular to the interpolation line 18 and directed toward the field: optical axis 24 for Camera 1, optical axis 30 for Camera 2, and optical axis 36 for Camera 3. These optical axes point straight across the field to maintain consistent viewing orientation.

Virtual camera 38 is positioned at the 13 m mark 52 along interpolation line 18, between Camera 2 26 and Camera 3 32. Virtual camera 38 is represented with a dotted outline to distinguish the virtual camera 38 from the physical cameras. A virtual camera optical axis 40, also shown with dotted lines, extends from the virtual camera 38 perpendicular to the interpolation line 18 and intersects a tracked object 42 positioned within the penalty box 14 at the 13 m field position.

A mathematical calculation box 44 demonstrates the geometric positioning algorithm used to determine the virtual camera location. The alpha calculation $\alpha=(Ox-C2x)/(C3x-C2x)=(13-10)/(20-10)=0.3$ establishes the fractional position along the interpolation line between Camera 2 and Camera 3. The corresponding camera weighting shows $W2=(1-\alpha)=0.7$ and $W3=\alpha=0.3$, indicating that the virtual viewpoint synthesis utilizes 70% weighting from Camera 2 and 30% weighting from Camera 3.

Box 46 provides visual reference indicators for the different line types and symbols used throughout the FIG. 1, including solid lines for real camera optical axes, dotted lines for virtual camera elements, and triangular projections for camera fields of view. Camera 1 provides auxiliary data for occlusion scenarios wherein the tracked object is hidden, such as a hurdle in the way of the tracked object. This auxiliary data may be visual information about what is occluded from other cameras of the system.

FIG. 1 demonstrates a principle of continuous virtual camera positioning using mathematical interpolation rather than discrete camera switching, with the virtual camera automatically maintaining a straight-ahead perspective of the tracked object 42 regardless of the object's position within the coverage area.

Figure 2:
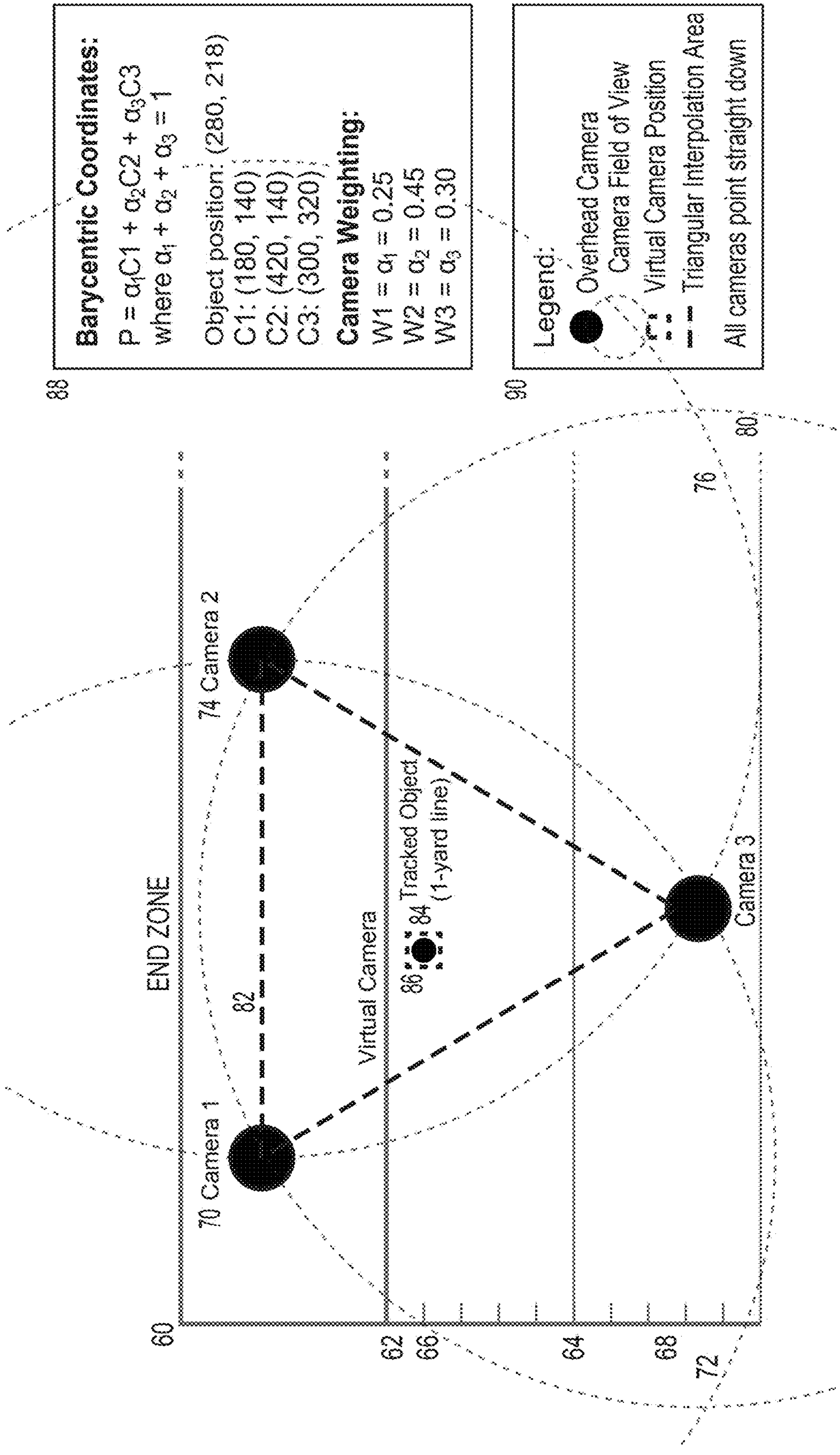
FIG. 2 illustrates the three-camera triangular configuration enabling two-dimensional virtual camera movement.

Another example is shown in FIG. 2, which illustrates a three-camera triangular configuration enabling two-dimensional virtual camera movement using barycentric coordinate positioning. FIG. 2 depicts a section of an American football field including an end zone 60, a goal line 62, and a field section 64 extending ten yards from the goal line with continuation markings indicating the field extends beyond the illustrated area. Hash marks 66 are positioned at regular intervals along sidelines 68 in accordance with standard football field markings.

Three overhead cameras are positioned in a triangular arrangement above the field coverage area. Camera 1 70 is positioned in the upper-left region, Camera 2 74 in the upper-right region, and Camera 3 78 in the lower-center region. Each camera is equipped with a circular field of view: field of view 72 for Camera 1, field of view 76 for Camera 2, and field of view 80 for Camera 3. The camera fields of view are sized to encompass the entire triangular interpolation area, ensuring complete coverage with substantial overlap as required for seamless virtual camera positioning.

A triangular interpolation area 82 is defined by the geometric area connecting the three camera positions, indicated by dashed lines forming the triangular boundary within which virtual camera positioning can occur. This triangular area represents the spatial region where two-dimensional virtual camera movement is enabled through barycentric coordinate calculations.

A tracked object 84 is positioned at the 1-yard line within the triangular coverage area. A virtual camera 86, represented by a dotted square outline, is positioned directly overhead of the tracked object 84, demonstrating the system's capability to maintain object-focused perspectives regardless of the object's position within the triangular interpolation area.

Barycentric coordinate calculation box 88 demonstrates the mathematical framework governing virtual camera positioning. The fundamental equation $P=\alpha_1C1+\alpha_2C2+\alpha_3C3$, where $\alpha_1+\alpha_2+\alpha_3=1$ establishes how any point within the triangular area can be expressed as a weighted combination of the three camera positions. For the illustrated tracked object position (280, 218) relative to camera positions C1: (180, 140), C2: (420, 140), and C3: (300, 320), the barycentric coordinates yield camera weightings of $W1=\alpha_1=0.25$, $W2=\alpha_2=0.45$, and $W3=\alpha_3=0.30$, indicating that virtual viewpoint synthesis utilizes 25% weighting from Camera 1, 45% weighting from Camera 2, and 30% weighting from Camera 3.

Box 90 provides visual reference indicators distinguishing overhead cameras from their fields of view, virtual camera positioning markers, and triangular interpolation area boundaries. In Box 90, all cameras point straight down, establishing an overhead perspective orientation that enables two-dimensional coverage of the field area.

FIG. 2 demonstrates the system's capability for continuous two-dimensional virtual camera positioning within the triangular interpolation area, contrasting with the linear one-dimensional movement illustrated in FIG. 1, and showing how barycentric coordinates enable precise virtual camera placement at any point within the triangular coverage zone while maintaining automated object-focused perspectives.

Figure 3:
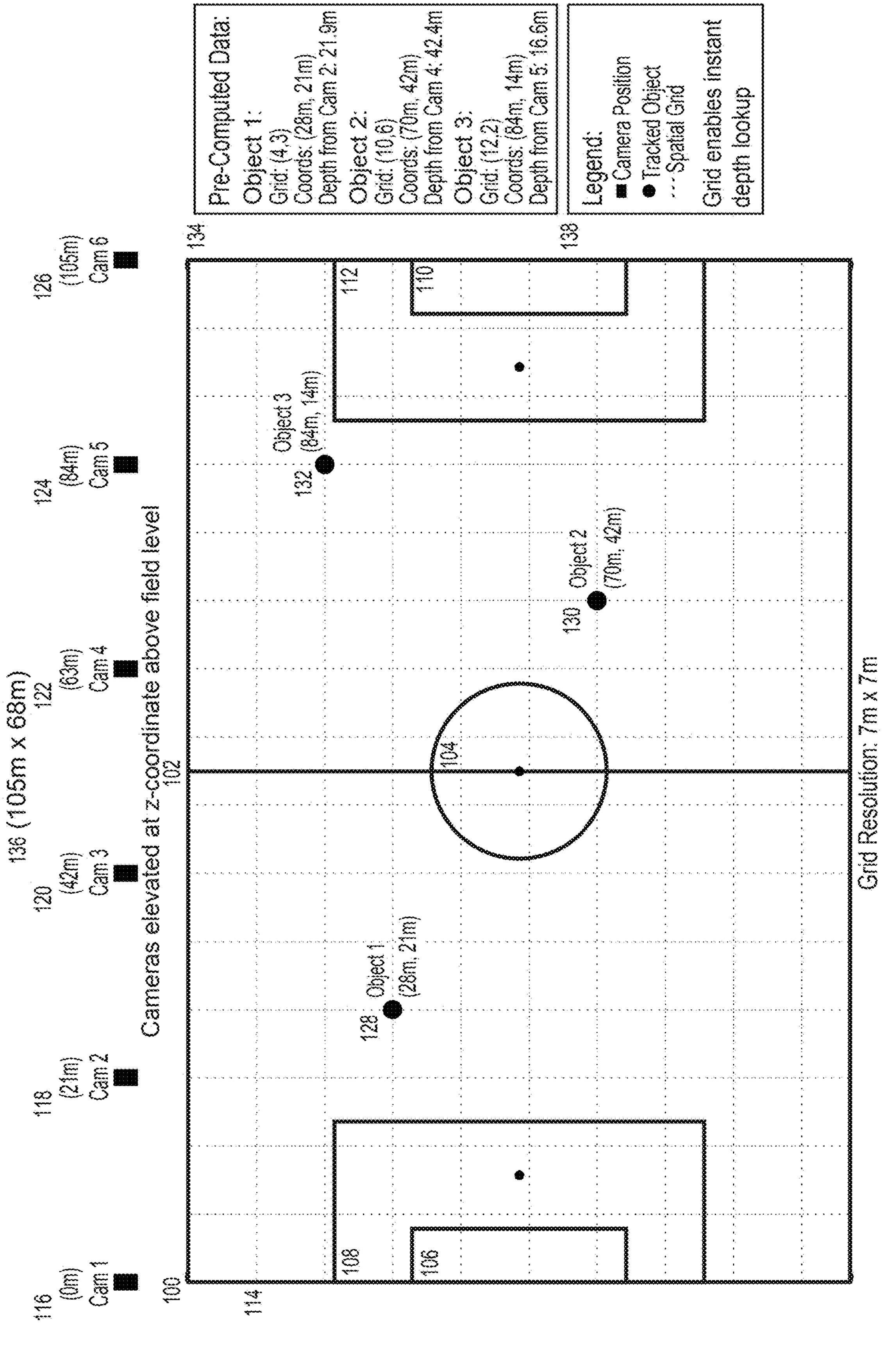
FIG. 3 depicts the pre-computed spatial mapping process for field geometry analysis.

FIG. 3 illustrates a pre-computed spatial mapping system applied to a standard size football field demonstrating the sports-field-optimized approach for eliminating real-time depth calculation. FIG. 3 shows field an outline 100 with a center line 102, a center circle 104, goal areas 106 and 110, and penalty areas 108 and 112, drawn to accurate scale (105 m×68 m) as indicated by field dimensions 136.

Six cameras are positioned at regular intervals along the sideline: Camera 1 116 at 0 m, Camera 2 118 at 21 m, Camera 3 120 at 42 m, Camera 4 122 at 63 m, Camera 5 124 at 84 m, and Camera 6 126 at 105 m. The cameras are elevated at z-coordinates above field level, providing comprehensive coverage of the competition area. In actual implementations, a greater number of cameras may be deployed with closer spacing to achieve enhanced coverage and tracking accuracy.

a spatial grid 114 overlays the entire field area with 7 m×7 m resolution, creating discretized zones for pre-computed depth lookup operations. The grid system divides the field into regular geometric cells, each containing pre-calculated spatial relationship data relative to all camera positions. In practical deployments, finer grid resolution may be employed to achieve sub-meter positioning accuracy as required for high-precision object tracking applications.

The spatial mapping process occurs during system calibration prior to live event coverage, establishing comprehensive geometric relationships between all grid positions and camera locations. During live operation, tracked objects are positioned relative to this pre-computed grid system, enabling instant depth estimation without real-time calculation overhead.

Three tracked objects demonstrate the system's capability for simultaneous multi-object positioning: Object 1 128 positioned at coordinates (28 m, 21 m), Object 2 130 at coordinates (70 m, 42 m), and Object 3 132 at coordinates (84 m, 14 m). a pre-computed data box 134 shows how each object's grid position translates directly to field coordinates and instant depth calculations relative to the nearest cameras. For example, Object 1 in grid cell (4,3) provides immediate depth lookup for any camera that contains the object in its field of view, as well as from any virtual camera position, demonstrating the elimination of computational overhead during live tracking operations.

Box 138 distinguishes camera positions, tracked objects, and spatial grid elements, noting that the grid system enables instant depth lookup capabilities. This box 138 emphasizes a pre-computed approach that provides rapid processing performance essential for live broadcasting applications by avoiding real-time stereoscopic depth calculation and complex scene reconstruction required by existing virtual camera systems.

FIG. 3 demonstrates sports-field-optimized spatial mapping, where known competition area geometry is leveraged to create comprehensive pre-computed lookup tables specifically designed for fast-moving object tracking scenarios. This approach differs from general-purpose spatial mapping systems by optimizing data structures and resolution specifically for 2D broadcast video generation rather than comprehensive 3D scene reconstruction, enabling the ultra-low latency performance critical for live sports broadcasting applications.

Figure 4:
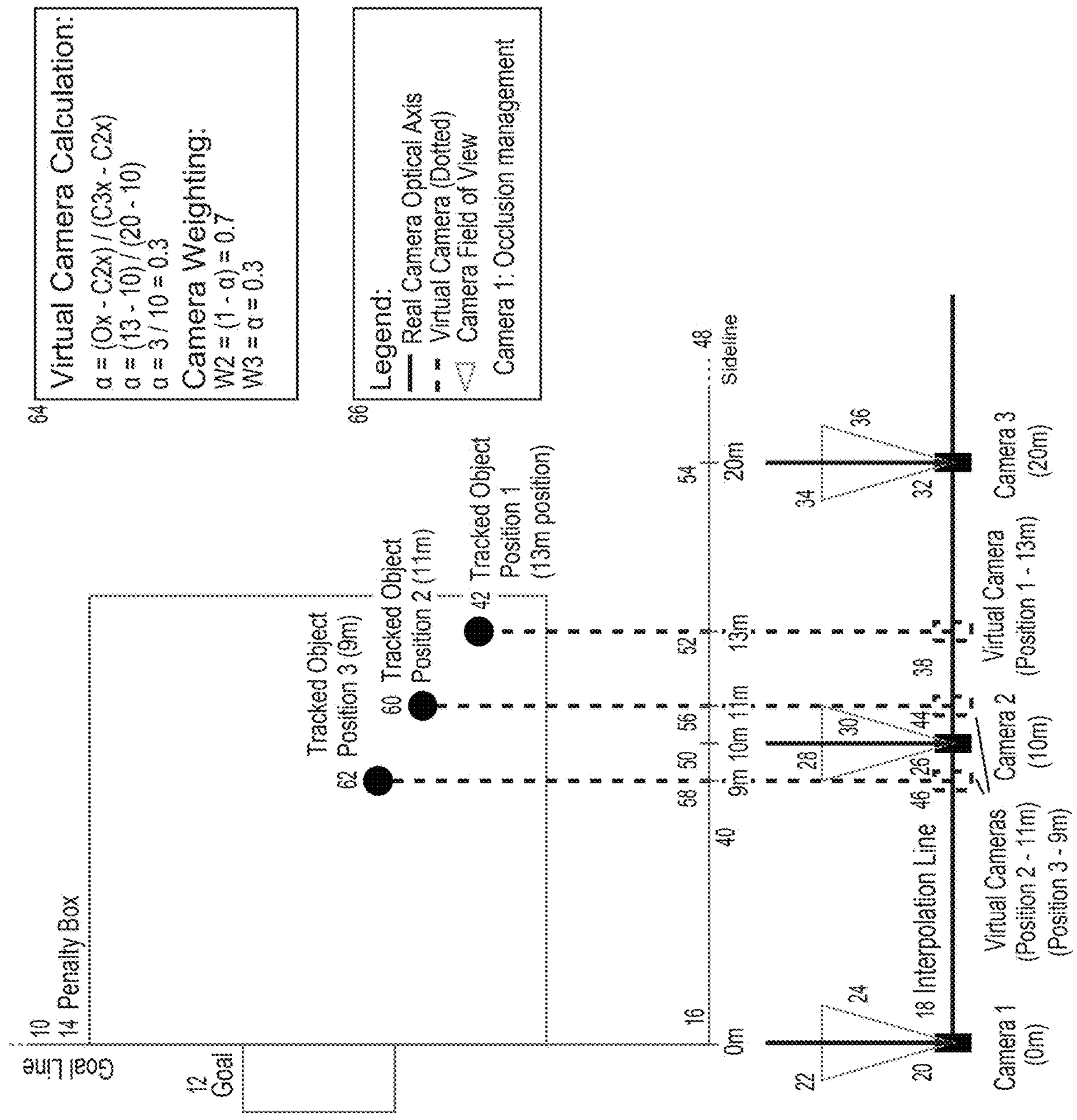
FIG. 4 shows the object tracking and virtual camera positioning workflow, including predictive camera set switching.

Another example is shown in FIG. 4, which illustrates the object tracking and virtual camera positioning workflow combined with predictive camera set switching capabilities. FIG. 4 shows a goal line 10, a goal 12, a penalty box 14, and a sideline 16 of a soccer field section. An interpolation line 18 connects the three camera positions along the sideline.

Camera 1 20 positioned at 0 m, Camera 2 26 at 10 m, and Camera 3 32 at 20 m each include fields of view 22, 28, and 34 respectively, with optical axes 24, 30, and 36 pointing perpendicular to the sideline 16.

FIG. 4 demonstrates continuous object tracking through three sequential positions showing realistic player movement toward the goal. Tracked object Position 1 42 is located at the 13 m position within the penalty box 14, tracked object Position 2 60 at the 11 m position, and tracked object Position 3 62 at the 9 m position. The movement pattern illustrates typical diagonal advancement toward the goal while the virtual camera positioning responds to the horizontal displacement component.

Virtual camera positioning adapts continuously to maintain object-focused perspectives. Virtual Camera Position 1 38 at 13 m corresponds to tracked object Position 1, Virtual Camera Position 2 44 at 11 m tracks Position 2, and Virtual Camera Position 3 46 at 9 m follows Position 3. Each virtual camera position is represented with dotted outlines and maintains optical axis alignment through the respective tracked object positions.

a virtual camera calculation box 64 demonstrates the mathematical framework governing positioning. For Position 1 at 13 m, the alpha calculation $\alpha=(13-10)/(20-10)=0.3$ yields camera weighting of W2=0.7 and W3=0.3, indicating primary interpolation between Camera 2 and Camera 3. As the object moves toward Position 2 and Position 3, the alpha value decreases, approaching the boundary threshold for camera set transition.

The predictive switching mechanism activates when the tracked object approaches the coverage boundary between camera sets. When the object reaches Position 2 at 11 m, the alpha calculation yields a value approaching zero, triggering activation of the adjacent camera set comprising Camera 1 and Camera 2. This preemptive activation ensures seamless continuation of virtual camera generation as the object transitions between coverage zones.

Camera set activation occurs before the tracked object reaches the exact boundary, providing sufficient processing time for smooth transitions. The timing of activation is determined by the object's approach to the boundary threshold rather than a fixed distance, enabling adaptive response to varying object velocities and movement patterns. When Position 3 triggers the transition, Camera 1 and Camera 2 become the primary cameras responsible for creating the interpolated virtual viewpoint, with the virtual camera positioning algorithm seamlessly transferring to the new camera pair.

Box 66 distinguishes between real camera optical axes shown as solid lines, virtual cameras indicated by dotted lines, and camera fields of view represented by triangular projections. This box 66 notes Camera 1's role in occlusion management at Positions 1 and 2, whereas Camera 3 will provide auxiliary data at Position 3. The continuous nature of virtual camera positioning eliminates discrete perspective jumps characteristic of camera switching systems.

FIG. 4 demonstrates a complete cycle from continuous object tracking through predictive boundary detection to seamless camera set transitions, illustrating how the system maintains uninterrupted object-focused perspectives across multiple camera coverage zones without manual intervention or jarring perspective changes.

Figure 5:
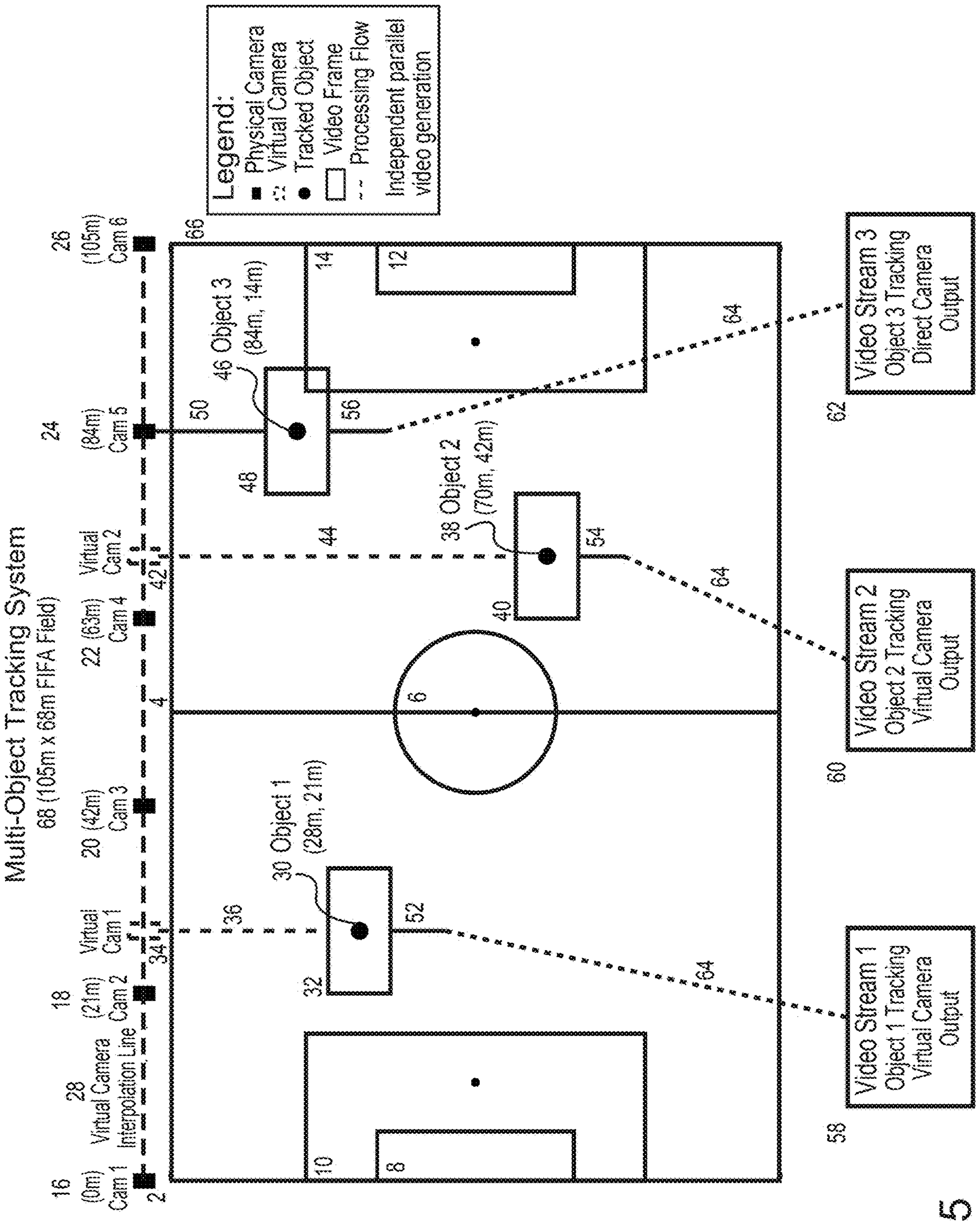
FIG. 5 shows multi-object tracking with simultaneous video output generation

In the example shown in FIG. 5, a multi-object tracking system is illustrated depicting simultaneous video output generation capabilities. FIG. 5 shows a field outline 2 of a standard size football field with a center line 4, a center circle 6, goal areas 8 and 12, and penalty areas 10 and 14, providing the spatial context for multi-object tracking operations.

Six physical cameras are positioned along the sideline at regular intervals: Camera 1 16 at 0 m, Camera 2 18 at 21 m, Camera 3 20 at 42 m, Camera 4 22 at 63 m, Camera 5 24 at 84 m, and Camera 6 26 at 105 m. A virtual camera interpolation line 28 passes horizontally through the physical camera positions, establishing the geometric framework for virtual camera positioning across the coverage area.

The system simultaneously tracks three objects positioned at different locations on the field. Object 1 30 is located at coordinates (28 m, 21 m) and is enclosed within a video frame 32, which represents the broadcast view maintaining the object in a focused perspective. Object 2 38 is positioned at coordinates (70 m, 42 m) within a video frame 40, and Object 3 46 is located at coordinates (84 m, 14 m) within a video frame 48. Each video frame demonstrates the system's capability to maintain object-focused perspectives regardless of the objects' positions within the coverage area.

Virtual camera positioning adapts independently for each tracked object. Virtual Camera 1 34 is positioned on the interpolation line 28 directly above Object 1, with virtual optical axis 36 extending from the virtual camera position to Object 1, maintaining the straight-ahead tracking perspective. Virtual Camera 2 42 is similarly positioned on the interpolation line 28 above Object 2, with a virtual optical axis 44 providing object-focused tracking. Object 3 requires no virtual camera positioning as it is optimally aligned with the direct feed from Camera 5, demonstrated by a direct optical connection 50 from Camera 5 to Object 3.

The distributed processing architecture enables independent video generation for each tracked object. Processing threads 52, 54, and 56 extend from each video frame, indicating dedicated computational resources allocated to each tracking operation. Processing flows 64 connect the individual video frames to the corresponding output streams, demonstrating the parallel processing capability that enables simultaneous multi-object tracking without computational interference between tracking operations.

Three independent video output streams are generated simultaneously: Video Stream 1 58 provides Object 1 tracking through virtual camera output, Video Stream 2 60 delivers Object 2 tracking via virtual camera synthesis, and Video Stream 3 62 supplies Object 3 tracking using direct camera feed. Each video stream operates independently with dedicated processing resources, enabling simultaneous broadcast of multiple object-focused perspectives without requiring discrete camera switching or manual operator intervention.

Box 66 distinguishes between physical cameras, virtual cameras shown with dotted outlines, tracked objects, video frames representing broadcast views, and processing flows indicating the distributed architecture. This box 66 emphasizes the independent parallel video generation capability that enables simultaneous tracking of multiple objects with separate virtual camera viewpoints.

FIG. 5 demonstrates the system's distributed multi-object architecture with independent virtual camera positioning for each tracked subject. This capability enables broadcasters to simultaneously generate multiple object-focused video streams, providing unprecedented flexibility for live sports coverage while maintaining the ultra-low latency performance essential for real-time broadcasting applications. The system automatically allocates computational resources and virtual camera positioning for each tracked object without requiring manual coordination or risking processing conflicts between simultaneous tracking operations.

In an example of a Seamless Camera Set Transition, a soccer field covered by multiple triangular camera sets. When a player tracked by Camera Set A (positioned at field coordinates covering the left side of the field) approaches the boundary between sets:

Current Set A: alpha1=0.1, alpha2=0.8, alpha3=0.1 (indicating approach to C2-C3 edge)

The predictive switching coordinator detects that alpha1 approaches zero and activates Camera Set B, which shares cameras C2 and C3 with Set A plus adds camera C4. As the player crosses the boundary:

New Set B: alpha2=0.4, alpha3=0.4, alpha4=0.2

This seamless transition maintains continuous object tracking while the virtual camera positioning smoothly transitions from Set A's triangular interpolation space to Set B's triangular space, with no jarring perspective changes experienced by viewers.

The present invention employs camera array configurations that enable precise virtual camera positioning at any point along defined interpolation paths, fundamentally distinguishing from simple camera switching or basic interpolation systems. The virtual camera positioning system provides continuously variable viewpoint generation with dynamic parallax correction that adapts in real-time to both virtual camera position and tracked object movement.

The virtual camera is not limited to simple midpoint interpolation but can be positioned at any fractional distance along the interpolation line. For example, with two cameras separated by 10 meters, the virtual camera can be dynamically positioned to simulate viewing from the 0.5-meter point, 3.7-meter point, 8.2-meter point, or any other position along the 10-meter baseline with sub-meter precision.

As the virtual camera position changes along the interpolation line, parallax correction parameters are dynamically recalculated using the computer spatial mapping system. This enables accurate perspective synthesis for virtual camera positions ranging from near-coincident with the first physical camera to near-coincident with the second physical camera, and all intermediate positions.

The geometric transformation applied to each camera's video feed varies continuously based on the virtual camera's position along the interpolation line. When the virtual camera is positioned near the first physical camera (e.g., at the 0.5-meter position), the first camera's feed requires minimal geometric correction while the second camera's feed undergoes substantial perspective transformation. Conversely, when the virtual camera approaches the second camera position (e.g., at the 9.5-meter position), the transformation weighting reverses.

A three-camera triangular configuration represents the minimum camera requirement for two-dimensional virtual camera movement, arranging three cameras in a triangular pattern with similar or identical orientations. This configuration enables virtual camera positioning at any point within the two-dimensional plane defined by the triangle formed by the three physical cameras, providing unprecedented flexibility for object-focused tracking with optimal camera efficiency.

The triangular three-camera arrangement provides the most efficient implementation of two-dimensional virtual camera movement, requiring the minimum number of cameras while achieving full two-dimensional positioning capability. This efficiency advantage makes triangular configurations particularly suitable for cost-sensitive deployments and applications requiring rapid system setup.

While the triangular three-camera configuration represents the minimum camera requirement for two-dimensional virtual camera movement within a single active zone, the system scales to accommodate larger competition areas through multiple camera sets. Extended deployments may include 10-20 or more total cameras arranged as sequential sets of 2-3 or more cameras each, providing comprehensive coverage through intelligent switching between camera sets as objects move across the competition area. Each individual camera set maintains the core 2D processing advantages and ultra-low latency characteristics, fundamentally differing from volumetric systems that require simultaneous processing of 30 or more cameras for 3D scene reconstruction.

In four-camera rectangular arrangements, cameras may be positioned at the corners of a rectangle with similar or identical orientations. Virtual camera positioning within the rectangular area utilizes bilinear interpolation algorithms that blend video feeds from all four cameras based on the virtual camera's position within the rectangular coordinate system.

For four-camera rectangular configurations positioned at coordinates (x1,y1), (x2,y1), (x1,y2), and (x2,y2), virtual camera position (x,y) within the rectangle utilizes bilinear interpolation weights: $W1=(x2-x)(y2-y)/((x2-x1)(y2-y1))$ $W2=(x-x1)(y2-y)/((x2-x1)(y2-y1))$ $W3=(x2-x)(y-y1)/((x2-x1)(y2-y1))$ $W4=(x-x1)(y-y1)/((x2-x1)(y2-y1))$, where $W1+W2+W3+W4=1$, providing smooth interpolation across the rectangular area.

The system supports various camera array configurations, including but not limited to two-camera linear arrangements, three-camera triangular configurations, four-camera rectangular arrangements, and extended multi-camera deployments. Four-camera configurations can be implemented as adjoining triangular regions sharing common camera positions, while larger arrays scale through sequential camera sets covering extended competition areas using the same core positioning algorithms.

Six-camera hexagonal arrangements provide enhanced interpolation quality, particularly suitable for central field positioning or multi-directional object tracking scenarios.

The triangular system employs barycentric coordinates to define virtual camera positions within the triangular area, where any point within the triangle is expressed as a weighted combination of the three camera positions. For virtual camera position P within triangle formed by cameras C1, C2, and C3, the position is defined as $P=alpha1*C1+alpha2*C2+alpha3*C3$, where $alpha1+alpha2+alpha3=1$, and all alpha values are non-negative.

For a standard European football field measuring 105 meters by 68 meters, the system pre-computes spatial relationships for a grid with sub-meter resolution specifically optimized for tracking fast-moving objects typical of sports environments. When a ball is positioned at coordinates (52.5 m, 34 m) on the field, the system instantly interprets this position is at the field center, equidistant from all boundaries, using pre-computed data structures optimized for sports applications rather than general-purpose spatial mapping. Additionally, the system provides pre-computed perspective correction factors for generating virtual camera views from any interpolated position between the active camera set. This sports-field-optimized approach eliminates the computational overhead of real-time stereoscopic depth calculation, geometric analysis, and perspective correction that represents the major latency bottleneck in existing virtual camera systems, providing the rapid processing performance essential for live broadcasting applications.

The automated virtual camera system integrates with existing broadcast infrastructure through standard video interfaces and protocols, enabling adoption within established production workflows while providing enhanced automated capabilities.

The system connects to existing broadcast production environments through standardized video output formats and control protocols. Video output utilizes broadcast-standard formats compatible with existing production switchers, recording systems, and transmission infrastructure. Control integration enables production teams to select tracked objects, adjust virtual camera parameters, and manage multiple simultaneous video streams through familiar broadcast control interfaces.

System deployment follows a structured workflow beginning with venue assessment and camera position planning based on coverage requirements and existing infrastructure constraints. Camera installation utilizes existing mounting infrastructure where possible, with new mounting positions designed to integrate with the venue architecture. The calibration process establishes spatial mapping data through systematic measurement and verification procedures, creating the pre-computed data structures essential for ultra-low latency operation.

During live broadcast operations, the system operates autonomously while providing production teams with intuitive controls for object selection and virtual camera management. Integration with existing broadcast graphics systems enables overlay of virtual camera content with conventional broadcast elements. The system maintains compatibility with existing broadcast timing and synchronization standards, ensuring seamless integration with established production workflows.

The system incorporates monitoring capabilities that ensure consistent performance during live broadcasting operations while providing feedback for system optimization and maintenance planning.

The system continuously monitors processing latency, tracking accuracy, and video quality metrics during operation. Performance monitoring enables automatic adjustment of processing parameters to maintain optimal performance under varying computational loads. Alert systems notify operators of performance degradation before it affects broadcast output quality.

System components incorporate redundancy mechanisms to maintain operation during hardware failures or network interruptions. Camera array redundancy enables continued tracking when individual cameras experience malfunctions. Processing system redundancy ensures uninterrupted virtual camera generation during hardware maintenance or unexpected failures.

The system includes procedures for verifying spatial mapping accuracy and camera calibration over time. Automated verification routines detect drift in camera positioning or calibration that could affect virtual camera accuracy. Maintenance scheduling ensures optimal system performance through preventive hardware servicing and calibration updates.

The system generates smooth, continuous virtual camera movement along the interpolation paths defined by the camera configurations. The virtual camera position varies continuously in response to object movement, eliminating discrete perspective jumps characteristic of camera switching systems. This continuous positioning maintains visual continuity as the virtual camera smoothly tracks objects across the coverage area.

Virtual camera movements are smoothed using adaptive algorithms that balance predictive positioning with reactive adjustments to object movement patterns. The system employs predictive algorithms that anticipate gradual object movement trajectories to maintain optimal positioning, while also implementing reactive smoothing for sudden directional changes or unexpected movements. When abrupt object motion occurs, the virtual camera may adjust with human-like delay characteristics, providing natural viewing transitions that avoid jarring perspective shifts. This reactive approach reduces computational overhead by eliminating the need for complex motion prediction during unpredictable movement scenarios, while the smoothing algorithms ensure gradual virtual camera repositioning that maintains viewer comfort even during rapid object direction changes.

It should be understood that the term “straight-ahead” refers to virtual camera positioning where tracked objects appear focused within the generated video frame and oriented perpendicular to the plane defined by the image capture sensors of the camera array. This orientation is maintained through geometric perpendicularity calculations and dynamic perspective correction that adapts to object movement and position changes.

It should be noted that the system may comprise an occlusion handling system configured to utilize auxiliary camera feeds for parallax-induced occlusion management in 2D video output with intelligent depth layering algorithms. Parallax refers to the different relative positioning of objects when viewed from different camera angles. For example, two players may appear aligned and overlapping when viewed from one camera, while appearing separated and fully visible from another camera position, providing depth relationship information for proper virtual viewpoint synthesis. Parallax-induced occlusion management uses the different viewing angles of multiple cameras to precisely determine object positioning relationships, including which objects are in front of or behind others.

The invention further relates to a method for generating automated object-focused video using a system like described below, the method comprises the steps of: positioning a plurality of cameras in predetermined configurations with substantially identical orientations; detecting and tracking at least one moving object within a coverage area using computer vision algorithms optimized for ultra-low latency, including but not limited to lightweight convolutional neural networks and temporal object coherence techniques; accessing computer spatial mapping data containing discretized depth information for positions within the coverage area with hierarchical spatial indexing; automatically determining virtual camera positions that maintain tracked objects in focused orientations using geometric positioning calculations; generating virtual camera viewpoints by interpolating video feeds from the plurality of cameras using advanced synthesis techniques including geometric transformation and multi-resolution processing based on the determined virtual camera positions; and outputting real-time video streams maintaining object-focused perspectives.

The step of accessing computer spatial mapping data may comprise the step of utilizing sports-field-optimized spatial mapping specifically designed for fast-moving object tracking applications with discretized spatial resolution and optimized data structures that eliminate real-time depth calculation overhead, avoiding the major latency bottlenecks associated with real-time stereoscopic depth analysis in existing virtual camera systems.

The step of positioning the plurality of cameras may comprise the steps of arranging two cameras to enable one-dimensional virtual camera movement with positioning calculated using geometric interpolation along the camera connection line.

The step of positioning the plurality of cameras may comprise the step of arranging three or more cameras to define a multi-dimensional area enabling two-dimensional virtual camera movement using barycentric coordinate systems with direct camera weighting correspondence.

The method may further comprise the step of analyzing object positioning variables to predict when objects will exit current camera coverage areas and seamlessly transitioning to different camera sets using predictive algorithms with mathematical positioning frameworks and multi-set activation strategies.

The step of detecting and tracking may further comprise the steps of simultaneously tracking multiple objects using distributed processing architectures and generating independent virtual camera viewpoints for each tracked object with separate positioning calculations and resource allocation.

The step of automatically determining virtual camera positions may comprise the step of maintaining tracked objects in configurable viewing orientations including perpendicular orientations and alternative angular relationships within camera field of view constraints.

The method may further comprise the step of dynamically adjusting viewing angles during operation to create dolly-style movements and angular perspective changes through computational processing with parallel GPU-accelerated transformation algorithms and equivalent processing techniques.

It should be noted that the term dolly-style refers to a technique in which the viewpoint of the virtual camera may continue to move and rotate like a camera mounted on a dolly. This technique is useful for situations in which the action of the sport creates sudden motion, such as a football player running forward and suddenly passing the ball backward.

The step of generating virtual camera viewpoints may comprise the step of preventing discrete camera switching artifacts (unintended visuals in a video output, which can appear, like static, pixelation, improper coloration, or often just distorted visuals, which do not show what is actually happening in real life) by maintaining continuous interpolation coefficients that eliminate abrupt perspective transitions characteristic of automated camera switching systems.

Preferably, the method can be applied to a standardized sports field comprising a soccer field, a football field, or other large rectangular playing area with predefined dimensions and boundaries.

Alternatively, the method can be applied to a racing venue comprising a Formula 1 racing circuit, track and field course, or other single run or loop racing path with camera sets positioned along the racing line.

The present invention also relates to a computer-readable storage medium containing instructions that, when executed by a processor, cause the processor to perform operations comprising the steps of: receiving video feeds from a plurality of cameras positioned in predetermined configurations with substantially identical orientations; identifying and tracking at least one moving object within a coverage area using object detection algorithms optimized for ultra-low latency performance, including but not limited to region of interest optimization and multi-scale detection hierarchies; accessing pre-computed sports-field-optimized spatial mapping data for the coverage area with discretized spatial resolution specifically designed for fast-moving object tracking applications and optimized lookup structures that eliminate real-time depth calculation overhead; calculating virtual camera positions that maintain tracked objects in focused orientations based on geometric positioning algorithms and the spatial mapping data; generating virtual camera viewpoints by interpolating the video feeds using advanced synthesis techniques including dense correspondence mapping and temporal consistency filtering based on the calculated virtual camera positions; and outputting real-time object-focused video streams with parallel processing optimization.

Along with the operations performed, a seamless transition is provided between different camera sets based on predicted object movement patterns using positioning variable analysis and boundary detection algorithms.

The operations performed may further comprise the step of simultaneously processing multiple tracked objects using parallel processing pipelines to generate independent virtual camera viewpoints for each object with distributed resource allocation.

Further, the operations performed may include the step of calculating virtual camera positions comprising the step of positioning virtual cameras to maintain configurable object orientations including perpendicular and alternative angular relationships with dynamic adjustment capabilities.

The invention claimed is:

1. A system for generating real-time object-focused video, comprising:
- a processor; and
- a non-transitory, processor-readable medium storing instructions that, when executed by the processor, cause the processor to:
  - identify at least one moving object within a coverage area using a convolutional neural network,
  - represent spatial data for positions within the coverage area as a plurality of depth vectors that defines a resolution that is based on the at least one moving object,
  - automatically determine virtual camera positions to track the at least one moving object from a desired orientation, based on a weighted combination of a plurality of cameras associated with the coverage area, and
  - generate virtual camera viewpoints based on the virtual camera positions by interpolating video feeds from the plurality of cameras based on the plurality of depth vectors.

2. The system of claim 1, wherein;
- the plurality of cameras defines at least a first set of cameras comprising at least a first camera and a second set of cameras comprising at least a second camera, wherein the instructions to cause the processor to track the at least one moving object include instructions to cause the processor to track a moving object from the at least one moving object within (1) a coverage area defined by a first set of cameras from the plurality of cameras and (2) a coverage area defined by the second set of cameras from the plurality of cameras; and
- the instructions to cause the processor to automatically determine the virtual camera positions include instructions to cause the processor to determine the virtual camera positions based on an alpha value associated with at least one of the coverage area defined by the first set of cameras or the coverage area defined by the second set of cameras.

3. The system of claim 1, wherein the instructions to cause the processor to determine the virtual camera positions include instructions to cause the processor to calculate a switching timing as a function of object velocity associated with the at least one moving object, a current position parameter, and a configurable boundary margin.

4. The system of claim 1, wherein;
- the plurality of cameras comprises a first camera and a second camera; and
- a virtual camera position from the virtual camera positions is (1) associated with a line defined by the first camera and the second camera and (2) defined by (Ox−C1x)/(C2x−C1x), where Ox is an object x-coordinate associated with the at least one moving object, C1x is a camera x-coordinate associated with the first camera, and C2x is a camera x-coordinate associated with the second camera.

5. The system of claim 1, wherein;
- the at least one moving object includes a plurality of objects; and
- the instructions to cause the processor to track the plurality of objects include instructions to cause the processor to concurrently track the plurality of objects by generating an independent virtual camera viewpoint for each tracked object from the plurality of objects.

6. The system of claim 1, wherein the instructions to cause the processor to track the at least one moving object include instructions to cause the processor to track the at least one moving object in configurable viewing orientations relative to a camera configuration geometry associated with the plurality of cameras.

7. The system of claim 1, wherein the non-transitory, processor-readable medium further stores instructions to cause the processor to:

receive a dynamic angle adjustment parameter during operation, the virtual camera viewpoints depicting dolly-style lateral movement and angular perspective changes based on the dynamic angle adjustment parameter.

8. The system of claim 1, wherein the non-transitory, processor-readable medium further stores instructions to cause the processor to correct a parallax error based on the video feeds, to generate the virtual camera viewpoints.

9. The system of claim 1, wherein the non-transitory, processor-readable medium further stores instructions to cause the processor to smoothly vary continuous interpolation coefficients based on the at least one moving object, to reduce at least one of discrete camera switching artifacts or abrupt perspective transitions.

10. The system of claim 1, wherein the instructions to cause the processor to represent the spatial data as the plurality of depth vectors include instructions to cause the processor to generate the plurality of depth vectors with sub-50 ms processing latency, using sports-optimized spatial reference data via discretized lookup tables.

11. The system of claim 1, wherein the plurality of cameras comprises three or more cameras arranged to define a multi-dimensional area enabling two-dimensional virtual camera movement within an area defined by positions of the three or more cameras using barycentric coordinates.

12. The system of claim 11, wherein;

the three or more cameras are arranged in a triangular configuration; and the instructions to cause the processor to cause the processor to determine the virtual camera position s include instructions to cause the processor to:

generate a plurality of camera weights associated with the weighted combination of the three or more cameras, based on the barycentric coordinates, and determine the virtual camera positions based on the plurality of camera weights.

13. The system of claim 11, wherein;

the three or more cameras are arranged in a rectangular configuration; and the instructions to cause the processor to determine the virtual camera position s include instructions to cause the processor to determine the virtual camera positions based on bilinear interpolation performed via parallel processing hardware.

14. The system of claim 11, wherein the instructions to cause the processor to generate the virtual camera viewpoints include instructions to cause the processor to apply, to the video feeds, a smoothing operation that balances predictive positioning with reactive adjustments, implementing human-like delay characteristics for abrupt object movements to reduce computational overhead while maintaining viewing comfort.

15. A method, comprising:

receiving, via a processor and from a plurality of cameras, image data that depicts an object;

providing the image data as input to a convolutional neural network to identify the object within the image data;

generating, via the processor, a plurality of depth vectors that (1) represents a plurality of depths for a coverage area associated with the plurality of cameras and (2) defines a resolution that is based on motion of the object;

determining, via the processor, a plurality of virtual camera positions to track the object, based on the plurality of depth vectors and a plurality of weights associated with the plurality of cameras; and generating, via the processor, video data that represents a plurality of virtual camera viewpoints, by interpolating, based on the plurality of virtual camera positions, the image data.

16. The method of claim 15, further comprising:

defining, via the processor, a grid having a plurality of cells, based on the coverage area associated with the plurality of cameras, each depth vector from the plurality of depth vectors being associated with a different cell from the plurality of cells.

17. The method of claim 15, wherein the resolution is a first resolution, the method further comprising:

defining, via the processor, a grid that represents a plurality of resolutions that includes the first resolution and a second resolution that is (1) different from the first resolution and (2) associated with an area of interest within the coverage area, the generating the plurality of depth vectors being based on the grid.

18. The method of claim 15, wherein the object includes at least one of a game player or a gameplay object.

19. The method of claim 15, wherein the generating the video data includes:

applying, via the processor, to the image data, and based on the plurality of depth vectors, at least one of a mesh warping operation, a dense correspondence mapping operation, an optical flow operation, or a temporal consistency filtering operation, to generate the video data.

20. The method of claim 15, wherein the generating the video data includes:

applying, via the processor, a mesh warping operation to the image data based on a mesh that is defined based on at least one of (1) a scene complexity associated with the coverage area or (2) a proximity of the object to at least one camera from the plurality of cameras.

* * * * *